(12) United States Patent
Hirano et al.

(10) Patent No.: US 7,635,075 B2
(45) Date of Patent: Dec. 22, 2009

(54) METHOD OF FRICTION STIR-SPOT WELDING AND WELDING APPARATUS

(75) Inventors: Satoshi Hirano, Hitachi (JP); Kinya Aota, Hitachi (JP); Masahisa Inagaki, Hitachi (JP); Kazutaka Okamoto, Hitachi (JP); Tomio Odakura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 252 days.

(21) Appl. No.: 10/589,988

(22) PCT Filed: Mar. 16, 2005

(86) PCT No.: PCT/JP2005/004602

§ 371 (c)(1),
(2), (4) Date: Aug. 18, 2006

(87) PCT Pub. No.: WO2005/089998

PCT Pub. Date: Sep. 29, 2005

(65) Prior Publication Data

US 2007/0181637 A1 Aug. 9, 2007

(30) Foreign Application Priority Data

Mar. 19, 2004 (JP) .............................. 2004-079395

(51) Int. Cl.
*B23K 20/12* (2006.01)
(52) U.S. Cl. .................................... 228/2.1; 228/112.1
(58) Field of Classification Search .................. 228/2.1, 228/112.1
See application file for complete search history.

(56) References Cited

U.S. PATENT DOCUMENTS

| 5,460,317 | A | 10/1995 | Thomas et al. | |
|---|---|---|---|---|
| 6,540,128 | B2 * | 4/2003 | Hirano et al. | 228/112.1 |
| 6,832,713 | B2 * | 12/2004 | Kano et al. | 228/2.1 |
| 2003/0029903 | A1 * | 2/2003 | Kashiki et al. | 228/112.1 |

FOREIGN PATENT DOCUMENTS

JP 2712838 10/1997

(Continued)

OTHER PUBLICATIONS

C. Schilling, A von Strombeck, J F dos Santos & N von Hessen, A preliminary onvestigation on the static properties of friction stir spot welds, Second Friction Stir Welding Symposium, Jun. 26-28, 2000.

(Continued)

*Primary Examiner*—Jessica L Ward
*Assistant Examiner*—Devang Patel
(74) *Attorney, Agent, or Firm*—Antonelli, Terry, Stout & Kraus, LLP.

(57) ABSTRACT

A problem of FSW spot-welding is that a bonding strength tends to be low, since an area of metallic bonding is limited to the neighborhood of a pin portion of the welding tool.

In order to solve the problem, after a tool (1) is inserted into a member (4) to be welded, a rotation shaft of the welding tool is tilted around a predetermined point (13) as a fulcrum, and the tip portion of the welding tool (1) is swung to enlarge a plastic flow area caused by rotation of the tool. As a result, the welding strength can be increased.

2 Claims, 6 Drawing Sheets

FOREIGN PATENT DOCUMENTS

| | | | |
|---|---|---|---|
| JP | 10052761 A * | 2/1998 | |
| JP | 10-249553 | 9/1998 | |
| JP | 2000-135575 | 5/2000 | |
| JP | 2001-314982 | 11/2001 | |
| JP | 2001-314983 | 11/2001 | |
| JP | 2002-137070 | 5/2002 | |

OTHER PUBLICATIONS

Chinese Official Action dated May 9, 2008.
Japanese Official Action issued on Oct. 20, 2009, for Application No. 2006-511196.

* cited by examiner

TYPE A

FIG. 6

TYPE B

FIG. 7

TYPE C

FIG. 8

TYPE D

METHOD OF FRICTION STIR-SPOT WELDING AND WELDING APPARATUS

TECHNICAL FIELD

The present invention relates to a method and an apparatus for carrying out welding by utilizing friction heat and plastic flow generated between a welding tool and a member to be welded by pressing the rotating welding tool having axial symmetry towards the member to be welded. The present invention is particularly suitable for spot welding of stacked metallic members.

BACKGROUND ART

A friction stir-welding method (hereinafter referred to as FSW) has been known wherein a metal rod (hereinafter referred to as a welding tool) made of a material having a hardness higher than that of a member to be welded is inserted into a portion of the member to be welded, followed by rotating the welding tool while moving the tool, thereby to carry out welding by a friction heat generated between the welding tool and the member to be welded. This method is disclosed in Patent document 1, for example. FSW is a method by which the member to be welded is softened by friction heat between the welding tool and the member, wherein rotation of the welding tool results in plastic flow phenomenon of the member, whose principle is different from arc welding where a member to be welded is melted.

A spot welding method employing the principle of FSW has been known in patent documents 2 and 3, for example.

Patent document 1: Japanese patent No. 2,712,838 (WO 93/10935)

Patent document 2: Japanese patent No. 3,400,409

Patent document 3: Japanese patent No. 3,429,475

OBJECTS TO BE ACHIEVED BY THE INVENTION

A conventional FSW is hard to be applied to welding of members having complicated contours wherein a pin portion of the welding tool is moved along a welding line of the members, while the pin portion is kept inserted. The reason for that is: when the members have curved faces, it is not easy to place a backing member all over the welding line of the members to be welded. It is also difficult to move the welding tool, keeping a insertion depth of the pin into the members. It may be conceivable to use a small sized backing member which is moved, while moving the backing member in accordance with the movement of the welding tool; an application field of this method is limited because a jig for pressing the backing member towards the members must be moved simultaneously.

Since in a method of spot-welding using FSW, an area of metallic welding is limited to a portion in the neighborhood of the pin portion of the welding tool, which is small; thus, a welding strength should be low.

It is an object of the present invention to provide a friction stir-spot welding and a welding apparatus, which is easy to apply them to welding of members having complicated contours, can make an area of metallic welding larger than the conventional FSW spot welding method and can increase a strength of the welded portion.

MEANS FOR ACHIEVING THE OBJECTS

The spot welding method of the present invention is featured by letting a pressed portion of the welding tool move towards the member, while keeping the welding tool pressed towards the member to be welded with an tilted rotation angle of the welding tool.

Further, a welding apparatus according to the present invention comprises a welding tool having an axial symmetry, a rotation device for rotating the welding tool around an axis, a driving device for moving the welding tool towards the rotation shaft, and a rotation angle conversion device for tilting the rotation shaft of the welding tool around one point in a direction of the rotation shaft of the welding tool as a fulcrum.

ADVANTAGES OF THE INVENTION

The welding method of the present invention is particularly suitable for welding of members having curved faces because the welding tool is not continuously moved along a welding line, pressing a backing member towards the members is easy, compared with the conventional FSW welding method wherein the welding tool is continuously moved. In addition to that, it is possible to enlarge an area of metallic welding to increase a welding strength, compared with the conventional spot welding.

EXPLANATION OF REFERENCE NUMERALS

1 - - - welding tool, 2 - - - motor for rotating the welding tool, 3 - - frame, 4 - - - member to be welded, 5 - - - hammer, 6 - - - stopper, 7 - - - spring, 8 - - - guide support, 9 - - - motor for moving the welding tool upward and downward, 10 - - - welding member holder, 11 - - - spring, 12 - - - belt, 13 - - - swing shaft for welding head, 14 - - - welding head, 15 - - - welding head base plate, 16 - - - pin portion, 17 - - - metallic welding area, 18 - - - air cylinder, 19 - - - rod, 20 - - - arm, 21 - - - welding member support.

PREFERRED EMBODIMENTS FOR PRACTICING THE PRESENT INVENTION

The embodiments of the present invention will be explained by reference to drawings. The welding apparatus of the present invention, which is shown in the following, may be used in the state that it is installed to a robot arm.

Embodiment 1

Figure 1:
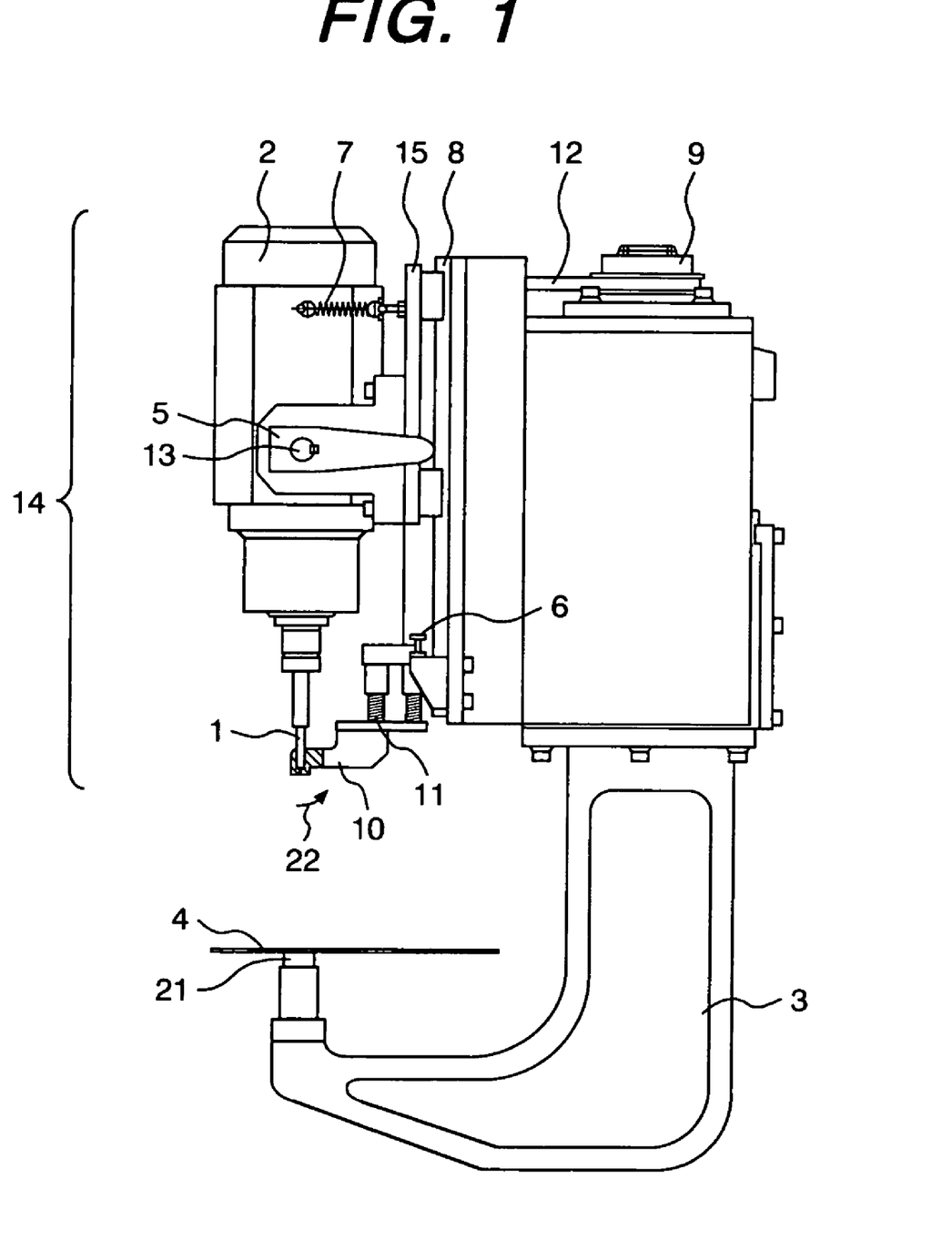
FIG. 1 shows a diagrammatic view of a welding apparatus according to one embodiment of the present invention.

FIG. 1 is a diagrammatic view of a structure of a welding apparatus according to one embodiment of the present invention. A size of the welding apparatus is about 1000 mm high, about 600 mm wide and about 300 mm thick (in a direction perpendicular to the face of paper). Reference numeral 1 denotes a welding tool, 2 a welding tool rotation motor, 3 a frame, 4 a member to be welded, 5 a hummer, 6 a stopper, 7 a spring, 8 a guide support, 9 a welding head up-and-down motor, 10 a holder for the member, 11 a spring, 12 a belt, 13 a welding head swing shaft, 14 a welding head, 15 a welding head base plate, and 21 a supporting tool for the member.

The welding head 14 is constituted by the welding tool rotation motor 2, the holder 2 for the member to be welded, the welding head base plate 15, etc. The welding head can move up-and down directions, i.e. the welding tool rotation shaft direction, along the guide support 8. The movement of the welding head 14 in the welding tool rotation shaft direction is conducted by transferring a rotation force of the welding head up-and-down moving motor 9 to a ball screw (not shown) by means of the belt 12, resulting in the up-and-down movement of the welding head 14 along the guide support 8. That is, in the welding apparatus of the present embodiment, the welding tool driving device is constituted by the welding tool up-and-down motor 9, the belt 12 for transferring the rotation force of the motor to the ball screw (not shown), and the guide support 8 for guiding the welding head.

The welding head 14 is so constituted that the welding tool rotation shaft is tilted towards a direction of the arrow 22 shown in FIG. 1, around the welding head swing shaft 13 as a fulcrum. Since the spring 7 connects the welding tool rotation shaft 2 and the welding head base plate 15, the welding head 14 does not rotate unless an external force is applied thereto.

The lower end of the holder 10 for the member to be welded is positioned at a distance closer to the member 4 than the lower end of the welding tool 1. Thus, the lower end of the holder 10 touches the member 4 at first when the welding head 14 comes down. Since the holder 10 for the member to be welded is installed to the welding head base plate 15, the holder 10 keeps such the state that the holder 10 is in elastic contact with the member 4 by the stretch-and-shrink of the spring, even when the welding head 14 comes down after the holder 10 contacts with the member. Accordingly, the holder 10 does not damage the member 14 and acts to hold the member under a predetermined force.

Figure 2:
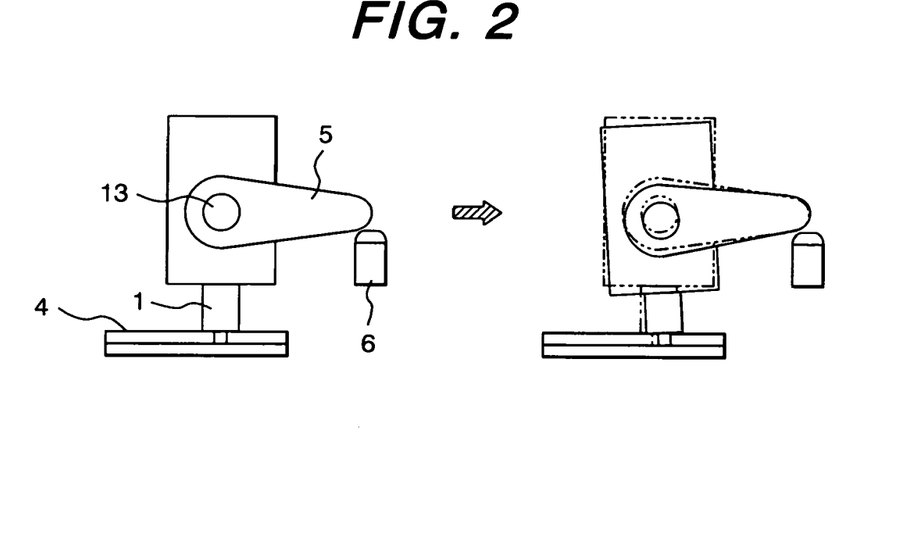
FIG. 2 shows an illustrative view of a movement of a welding head at the time of descent movement of the welding head.

FIG. 2 shows a diagrammatic view of an operation of the welding head at the time of descent of the welding head. When the welding tool 1 is inserted into the member 4 by a predetermined depth, the lower end of the hummer 5 touches the stopper 6. If the welding head 14 further comes down, the lower end of the hummer 5 touches the stopper. When the welding head 14 further comes down from the above state, the welding head 14 performs rotation movement around the welding head swing shaft 13 as the fulcrum and the rotation shaft of the welding tool slightly tilts from the vertical position with respect to member 4. As a result, the tip portion of the welding tool 1 moves from a state shown by a dotted line in the right drawing in FIG. 2 to the state shown by the solid-line.

In roughly speaking, the movement of the tip portion of the welding tool is carried out by a contact of the holder 10 to the member 4 to be welded, insertion of the welding tool 1 into the member 4, tilting of the welding tool rotation shaft around the welding head swing shaft 13 as the fulcrum, and swing operation of the tip portion of the welding tool. In the present embodiment, the welding head swing shaft 13, the hummer 5 and the stopper 6 constitute the welding tool rotation shaft conversion device.

As is described above, according to the welding apparatus shown in FIG. 1, the pressing force of the welding tool 1 to the member 4 to be welded and the movement of the welding tool 1 in the horizontal direction can be conducted only by the driving force in the up-and-down directions of the welding head 14. The welding method and welding apparatus of the present invention may include embodiments wherein a welding tool has a pin portion or a welding tool has no pin portion.

Welding experiments were carried out using the welding devices shown in FIG. 1. Table 1 shows results of experiments. The experiments include four kinds, i.e. the welding tool having the pin portion, the welding tool having no pin portion, the movement of the welding tool in the horizontal direction and no movement.

TABLE 1

| Type | Welding tool | Movement in the horizontal direction |
| --- | --- | --- |
| A | With the pin portion | No |
| B | No pin portion | No |
| C | With the pin portion | Movement |
| D | No pin portion | Movement |

The type A in Table 1 corresponds to the conventional welding method. The type B is a comparative embodiment and the types C and D are methods of the present invention.

Figure 3:
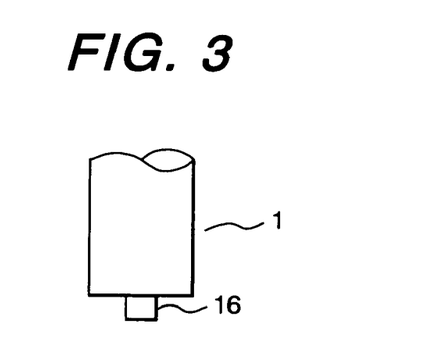
FIG. 3 shows a diagrammatic view of the welding tool of a type having a pin portion.
Figure 4:
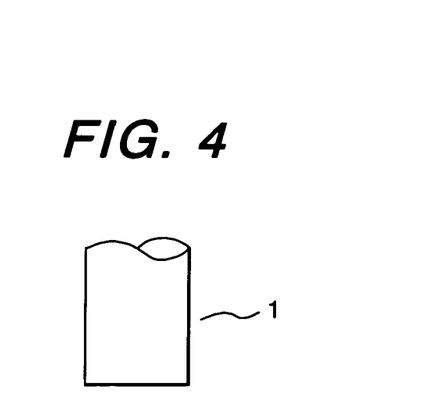
FIG. 4 is a diagrammatic view of a welding tool of a type having no pin portion.
Figure 5:
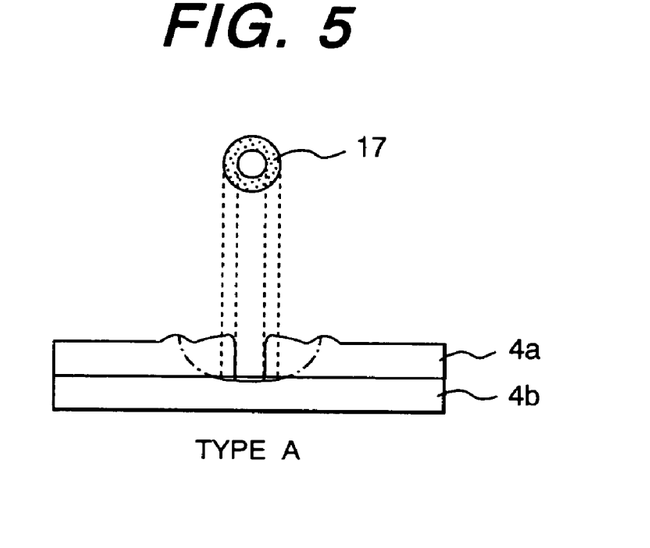
FIG. 5 shows a cross sectional view of a welded area and a metallic welding area of a member to be welded, which is welded by a conventional spot welding using the welding tool having the pin portion.

In the types A and C, the welding tools 1 having the pin portion 16 as shown in FIG. 3 were used. The size of the welding tools in types A and C was a diameter of a large diameter was 8 mm, and a diameter of the pin portion was 3 mm. In types B and D, the welding tools 1 having a pin portion were used as shown in FIG. 4. The diameter of the welding tool was 8 mm.

In the types C and D, the movement distance of the welding tool in the horizontal direction was set as 3 mm. The member to be welded was aluminum alloy (A6111-O) and had a thickness of 1 mm. The rotation number of the welding tool was 3500 rpm, and an insertion speed of the welding tool into the member was 100 mm/min.

FIGS. 5-8 show diagrammatic views of cross sections of the member after being bonded. Sizes of metallic welding areas 17 were calculated wherein the members 4a, 4b are judged as being metallic bonded by observation of the cross sections. The sizes of the metallic welding areas are shown in FIG. 9, wherein a reference number is the value of type A, and the other numbers are amplifications of the reference number.

In case where welding tools having pin portions like types A and C are used, there remains a hole after the welding tool is withdrawn, which does not become an effective welding area, and the metallic welding area 17 becomes a hollow disc form. On the other hand, in case where a welding tool having no pin portion like types B and D, there does not remain a hole after the welding tool is withdrawn, and the metallic welding area 17 becomes a disc form with no hole.

Figure 7:
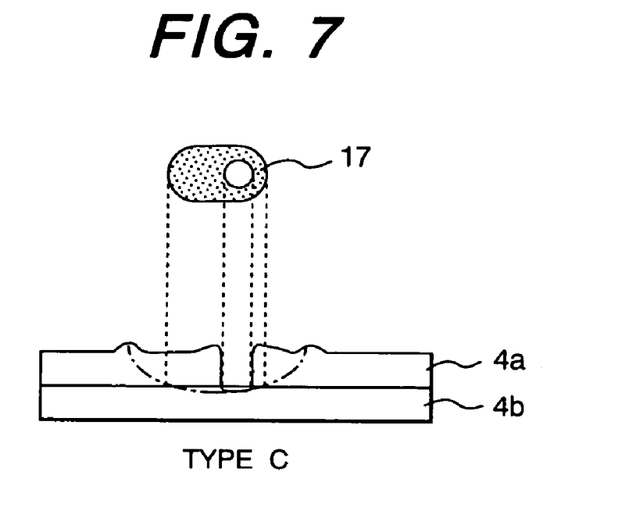
FIG. 7 shows a cross sectional view of a welded area and a metallic welding area of a member to be welded, which is welded by a spot welding of the present invention, using the welding tool having the pin portion.

When the type A is compared with the type C, the metallic welding area 17 can be enlarged by moving the tip portion of the welding tool in the horizontal direction with respect to the members 4a, 4b, as shown in FIG. 7. The enlarged metallic welding area 17 increases a welding strength. That is, a welding strength of the type A of FIG. 5 was 90 kgf and that of the type C of FIG. 7 was 125 kgf.

Figure 6:
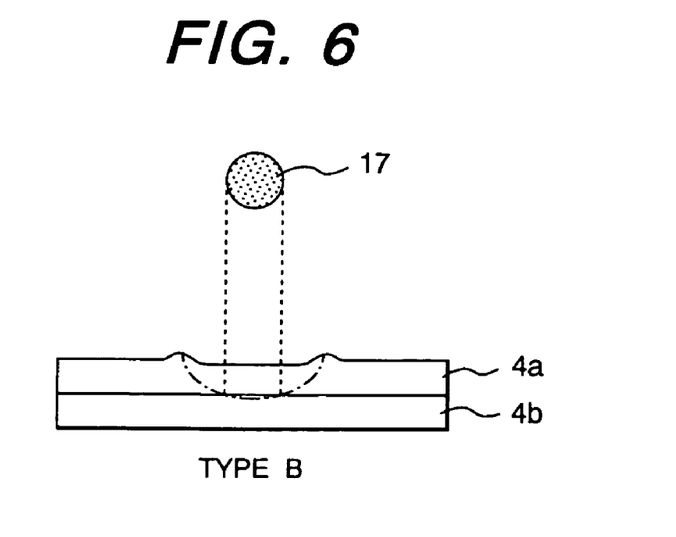
FIG. 6 shows a cross sectional view of a welded area and a metallic welding area of a comparative embodiment, which uses a welding tool having no pin portion.
Figure 8:
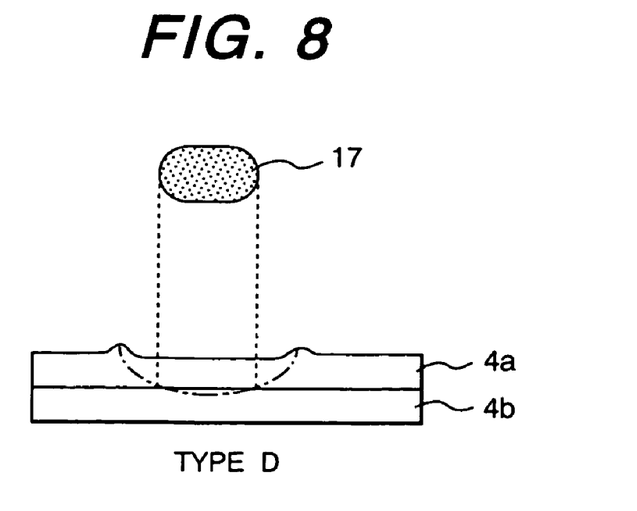
FIG. 8 shows a cross sectional view of a welded area and a metallic welding area of a member to be welded, which is welded by a conventional spot welding using the welding tool having no pin portion.
Figure 9:
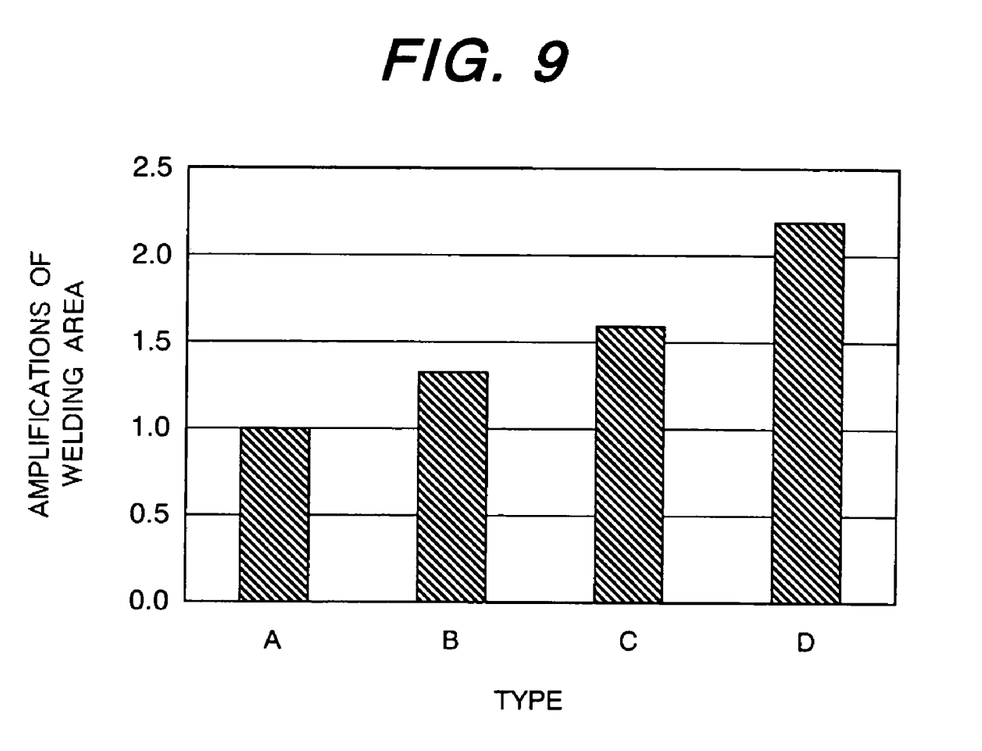
FIG. 9 is a graph showing relationship between the metallic welding area indexes wherein a value of the type A is made a standard value.

When the type B welding tool is compared with the type D welding tool, both of them having no pin portions, swing of the tip portions of the welding tools enlarges the metallic welding area 17 thereby to increase a welding strength, as is apparent from comparison between FIG. 6 and FIG. 8.

In the present embodiment, a so-called built-in motor was used wherein a spindle is built in a welding tool rotation motor 2 as an integrated structure, but other ones such as induction motors, servomotors can be used, too.

Embodiment 2

Figure 10:
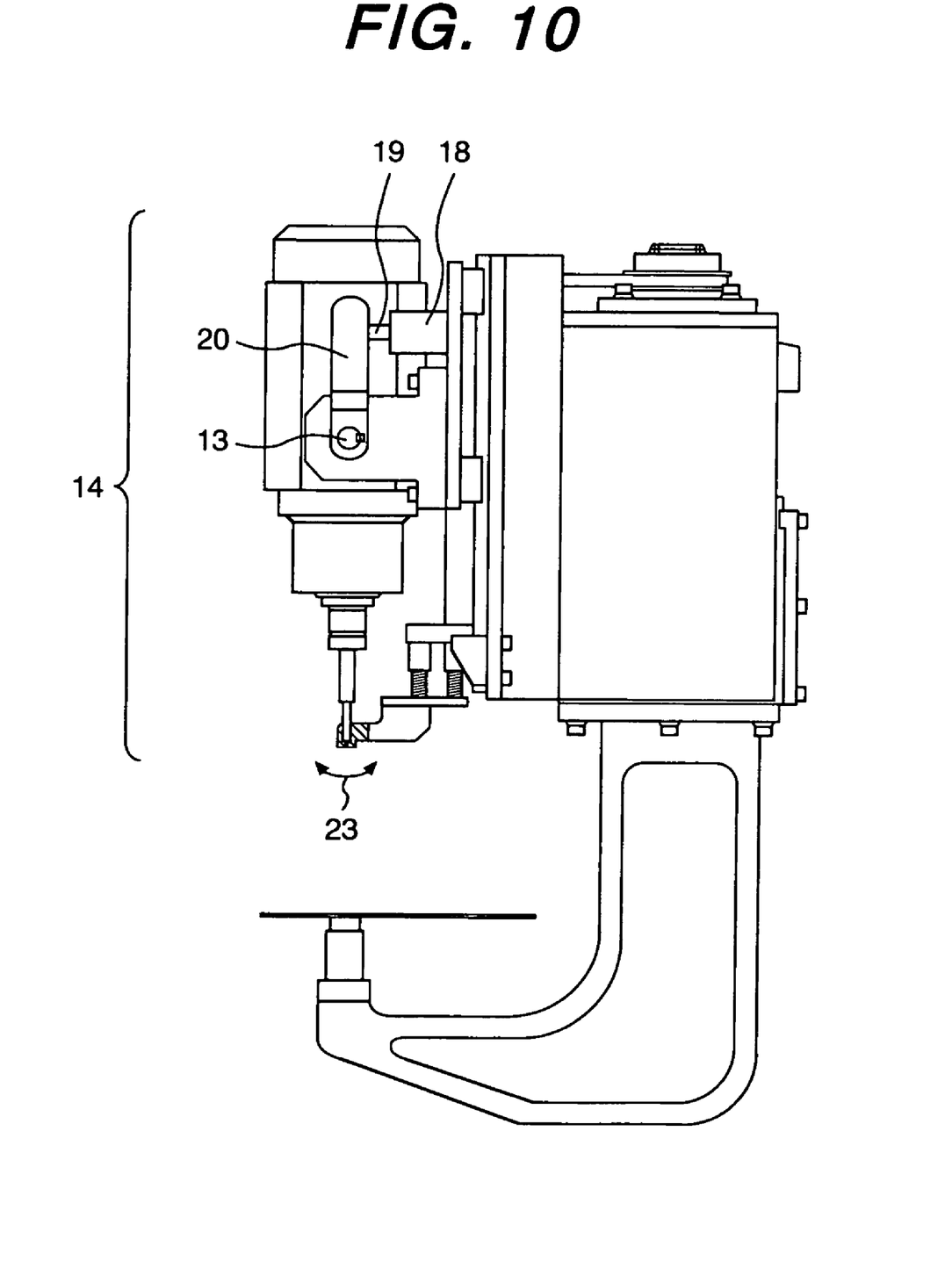
FIG. 10 shows a diagrammatic view of a welding apparatus according to another embodiment of the present invention.

FIG. 10 shows another embodiment of the welding apparatus according to the present invention. The welding apparatus in this embodiment, a welding tool shaft conversion device is constituted by an air cylinder 18, rod 19 and arm 20. The device rotates around the welding head swing shaft 13 as a fulcrum, and the tip portion of the welding tool disposed to the welding head is so constituted as to swing in the direction shown by an arrow 23. Other structures are same as those of the welding apparatus shown in FIG. 1.

In the welding apparatus shown in FIG. 10, when the rod 19 is stretched and shortened by the air cylinder 18, the arm 20 makes rotation movement around the welding head swing shaft 13 as the fulcrum. In response to the rotation movement of the arm, the welding head 14 makes rotation movement and the tip portion of the welding tool moves. According to the welding apparatus of the present embodiment, the rotation direction and rotation angle of the welding head 14 can be changed arbitrarily by the moving direction and the moving distance of the rod 19. It is possible to automatic control when the timing and swing stroke of the welding tool are programmed in advance.

In the case of FIG. 1, though the welding tool that has been inserted into the member to be welded can be moved only in one direction, the welding tool shown in FIG. 10 can move in both directions, i.e. right and left directions, which leads to enlargement of the moving distance of the tip portion of the welding tool.

In the present embodiment, the movement of the rod 19 is done by a driving force of compressed air from the air cylinder, and a hydraulic pressure can be used as a driving force for the rod 19. The rod 19 can be moved by the driving force of the servomotor thereby to control precisely the moving distance.

Further, when a direction of the rotation movement of the welding head 14 can be made vertical with respect to the paper face, which is not shown, in FIG. 10, it is possible to increase flexibility with respect to limitations due to sizes or contours of the welding portions.

INDUSTRIAL APPLICABILITY

The present invention can be applied to spot welding of metallic members.

The invention claimed is:

1. A friction stir-spot welding apparatus for inserting a welding tool being a symmetry with respect to a shaft, while rotating under a pressure into a portion of a member to be welded, thereby to heat and soften the member in the neighborhood of the welding tool by friction heat so as to integrate the member at a welding portion, characterized in that the device comprises:

a driving device for driving the welding tool in the direction of the rotation shaft thereof; and a rotation shaft conversion device for converting the rotation shaft of the welding tool, wherein the welding tool rotation shaft conversion device comprises a hummer one end of which is connected to a welding head swing shaft having one point in the direction of the rotation shaft of the welding tool as a fulcrum; and a stopper to which the other end of the hummer collides when the welding head comes down, wherein the tip portion of the welding tool held by the welding head swings around the welding head swing shaft as the fulcrum when the hummer further comes down from the state where the hummer collides the stopper.

2. The friction stir-spot welding apparatus according to claim 1, characterized in that the welding tool driving device comprises a welding head up-and-down moving motor for moving a welding head for holding the welding tool in the direction of the rotation shaft of the welding tool; a belt for transferring the rotation force of the motor to a ball spring; and a guide support for guiding the welding head that moves in accordance with the rotation of the ball spring.

\* \* \* \* \*